United States Patent
Waingold et al.

(10) Patent No.: US 7,877,379 B2
(45) Date of Patent: Jan. 25, 2011

(54) DELAYING EVALUATION OF EXPENSIVE EXPRESSIONS IN A QUERY

(75) Inventors: Allison Waingold, Sunnyvale, CA (US); Rafi Ahmed, Fremont, CA (US); Bhaskar Ghosh, Palo Alto, CA (US); Dinesh Das, Redwood City, CA (US); Mohamed Zait, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1054 days.

(21) Appl. No.: 11/242,361

(22) Filed: Sep. 30, 2005

(65) Prior Publication Data

US 2007/0078812 A1 Apr. 5, 2007

(51) Int. Cl.
  *G06F 7/00* (2006.01)
(52) U.S. Cl. ............... 707/718; 707/719; 707/999.002
(58) Field of Classification Search ............... 707/1, 707/2, 3, 4, 100, 718, 719, 999.002
  See application file for complete search history.

(56) References Cited

U.S. PATENT DOCUMENTS

| | | | |
|---|---|---|---|
| 4,769,772 A | 9/1988 | Dwyer | |
| 4,829,427 A | 5/1989 | Green | |
| 5,091,852 A | 2/1992 | Tsuchida et al. | |
| 5,325,525 A | 6/1994 | Shan et al. | |
| 5,339,429 A | 8/1994 | Tanaka et al. | |
| 5,452,468 A | 9/1995 | Peterson | |
| 5,495,419 A | 2/1996 | Rostoker et al. | |
| 5,495,605 A * | 2/1996 | Cadot ........................... | 707/4 |
| 5,495,606 A | 2/1996 | Borden et al. | |
| 5,537,588 A | 7/1996 | Engelmann et al. | |
| 5,551,027 A | 8/1996 | Choy et al. | |
| 5,574,900 A | 11/1996 | Huang et al. | |
| 5,590,319 A | 12/1996 | Cohen et al. | |
| 5,590,324 A | 12/1996 | Leung et al. | |
| 5,642,515 A | 6/1997 | Jones et al. | |
| 5,675,791 A | 10/1997 | Bhide et al. | |
| 5,680,547 A | 10/1997 | Chang | |

(Continued)

OTHER PUBLICATIONS

German Patent Office, "Office Action," GR App. No. P4479320.9-53, dated Dec. 22, 2005 (5 pages), with English translation (4 pages).

(Continued)

*Primary Examiner*—Miranda Le
(74) *Attorney, Agent, or Firm*—Hickman Palermo Truong & Becker LLP

(57) ABSTRACT

Techniques are provided for delaying evaluation of expensive expressions in a query. Expensive expressions in the query are established by cost information or by looking up a list of known expensive expressions for a match. After an execution plan is determined by using the early evaluation technique, one or more equivalent execution plans is established. The one or more equivalent execution plans may include both a type of execution plans that delay evaluation of expensive expressions and a type of execution plans that do not. In addition, the one or more equivalent execution plans may include both parallelized and non-parallelized alternatives to the execution plan identified by the early evaluation technique. Finally, based on a set of criteria, which may include comparing cost information among all the equivalent execution plans generated thus far, the best execution plan is chosen for the query.

18 Claims, 14 Drawing Sheets

U.S. PATENT DOCUMENTS

| | | | |
|---|---|---|---|
| 5,710,915 | A | 1/1998 | McElhiney |
| 5,787,251 | A | 7/1998 | Hamilton et al. |
| 5,797,136 | A | 8/1998 | Boyer et al. |
| 5,822,748 | A * | 10/1998 | Cohen et al. ............... 707/2 |
| 5,832,477 | A | 11/1998 | Bhargava et al. |
| 5,857,180 | A | 1/1999 | Hallmark et al. |
| 5,905,981 | A | 5/1999 | Lawler |
| 5,918,225 | A | 6/1999 | White et al. |
| 5,924,088 | A * | 7/1999 | Jakobsson et al. ............ 707/2 |
| 5,960,427 | A | 9/1999 | Goel et al. |
| 5,963,932 | A | 10/1999 | Jackobsson et al. |
| 5,974,408 | A * | 10/1999 | Cohen et al. ............... 707/2 |
| 6,009,265 | A | 12/1999 | Huang et al. ............. 395/600 |
| 6,021,405 | A | 2/2000 | Celis et al. |
| 6,026,394 | A | 2/2000 | Tsuchida et al. |
| 6,061,676 | A | 5/2000 | Srivastava et al. |
| 6,067,542 | A | 5/2000 | Carino, Jr. |
| 6,289,334 | B1 | 9/2001 | Reiner et al. |
| 6,298,342 | B1 | 10/2001 | Graefe et al. |
| 6,339,768 | B1 | 1/2002 | Leung et al. |
| 6,366,934 | B1 | 4/2002 | Cheng et al. |
| 6,370,524 | B1 | 4/2002 | Witkowski |
| 6,430,550 | B1 | 8/2002 | Leo et al. |
| 6,438,558 | B1 | 8/2002 | Stegelmann |
| 6,438,562 | B1 | 8/2002 | Gupta et al. |
| 6,510,422 | B1 * | 1/2003 | Galindo-Legaria et al. ..... 707/2 |
| 6,529,896 | B1 | 3/2003 | Leung et al. |
| 6,529,901 | B1 | 3/2003 | Chaudhuri et al. |
| 6,622,138 | B1 * | 9/2003 | Bellamkonda et al. ......... 707/2 |
| 6,684,203 | B1 | 1/2004 | Waddington et al. |
| 6,694,306 | B1 | 2/2004 | Nishizawa et al. |
| 6,792,420 | B2 * | 9/2004 | Chen et al. ............... 707/3 |
| 6,799,184 | B2 | 9/2004 | Bhatt et al. |
| 6,801,905 | B2 * | 10/2004 | Andrei ................... 707/2 |
| 6,832,219 | B2 | 12/2004 | Lal |
| 6,901,405 | B1 | 5/2005 | McCrady et al. |
| 6,915,304 | B2 | 7/2005 | Krupa |
| 6,934,699 | B1 | 8/2005 | Haas et al. |
| 6,941,360 | B1 | 9/2005 | Srivastava et al. |
| 6,947,927 | B2 | 9/2005 | Chaudhuri et al. |
| 6,954,776 | B1 | 10/2005 | Cruanes et al. |
| 6,961,729 | B1 | 11/2005 | Toohey et al. |
| 6,980,988 | B1 | 12/2005 | Demers et al. |
| 6,990,503 | B1 | 1/2006 | Luo et al. ............... 707/200 |
| 7,024,425 | B2 | 4/2006 | Krishnaprasad et al. |
| 7,089,225 | B2 | 8/2006 | Li et al. |
| 7,146,360 | B2 * | 12/2006 | Allen et al. ............... 707/5 |
| 7,246,108 | B2 | 7/2007 | Ahmed |
| 7,363,289 | B2 | 4/2008 | Chaudhuri et al. |
| 7,440,935 | B2 | 10/2008 | Day et al. |
| 2001/0047372 | A1 | 11/2001 | Gorelik et al. |
| 2002/0038313 | A1 | 3/2002 | Klein et al. |
| 2002/0138376 | A1 | 9/2002 | Hinkle |
| 2003/0055814 | A1 * | 3/2003 | Chen et al. ............... 707/3 |
| 2003/0140308 | A1 | 7/2003 | Murthy et al. |
| 2003/0167258 | A1 | 9/2003 | Koo et al. |
| 2004/0220911 | A1 | 11/2004 | Zuzarte et al. |
| 2005/0010896 | A1 | 1/2005 | Meliksetian et al. |
| 2005/0033730 | A1 * | 2/2005 | Chaudhuri et al. ............ 707/1 |
| 2005/0076018 | A1 | 4/2005 | Neidecker-Lutz |
| 2005/0149584 | A1 | 7/2005 | Bourbonnais et al. |
| 2005/0187917 | A1 | 8/2005 | Lawande et al. |
| 2005/0198013 | A1 | 8/2005 | Cunningham et al. |
| 2005/0210010 | A1 | 9/2005 | Larson et al. |
| 2005/0283471 | A1 | 12/2005 | Ahmed |
| 2006/0041537 | A1 | 2/2006 | Ahmed |
| 2006/0167865 | A1 | 7/2006 | Andrei |
| 2006/0218123 | A1 | 9/2006 | Chowdhuri et al. |
| 2007/0027880 | A1 * | 2/2007 | Dettinger et al. ............ 707/100 |
| 2007/0038649 | A1 | 2/2007 | Agrawal et al. |
| 2007/0073642 | A1 | 3/2007 | Ghosh et al. |
| 2007/0073643 | A1 * | 3/2007 | Ghosh et al. ............... 707/2 |
| 2008/0189302 | A1 | 8/2008 | Evani |
| 2008/0243916 | A1 | 10/2008 | Liu |
| 2009/0055349 | A1 | 2/2009 | Ahmed |

OTHER PUBLICATIONS

Current Claims, GR App. No. P4479320.9-53, 9 pages (attached).
Borla-Salamet, Pascale, "Compiling Control into Database Queries for Parallel Execution Management," IEEE Conference on Parallel Distributed Information Systems, 1991, ISBN 0-8186-2295-4, pp. 271-279.
Bergsten, et al., "Prototyping DBS3 a Shared-Memory Parallel Database System",IEEE, 226-234, 1991.
Bhide, Anupam "An Analysis of Three Transaction Processing Architectures", Computer Science Division, UC Berkeley, 1998, pp. 339-350.
Copeland, George et al., "Data Placement in Bubba," MCC, 1988, pp. 99-108.
Dewitt, et al., "A Performance Analysis of the Gamma Database Machine," Computer Sciences Department, University of Wisconsin, 1988, pp. 350-360.
Englert, Susan et al., "A Benchmark of NonStop SQL Release 2 Demonstrating Near-Linear Speedup and Scaleup on Large Databases", Technical Report 89.4, May 1989, pp. 1-23.
Hirano, et al., "Load Balancing Algorithm for Parallel Processing on Shared Memory Multiprocessor", IEEE, pp. 210-217, 1991.
Hong, et al., "Optimization of Parallel Query Execution Plans in XPRS", Proceedings of the First International Conference on Parallel and Distributed Information Systems, IEEE, 1991, pp. 218-225.
Graefe, Goetz, "Encapsulation of Parallelism in the Volcano Query Processing System," Mar. 1990, pp. 102-111.
Leverenz et al., "Oracle 8i Concepts Release 8.1.5", Oracle Corporation, Feb. 1999, located on the internet at <http://www.csee.umbc.edu/help/oracle8/server.815/a67781/toc.htm>, 121 pages.
Stonebraker, Michael, et al. "The Design of XPRS,", et al., EECS Department UC Berkeley, 1988, pp. 318-330.
Tandem, "A Benchmark of NonStop SQL on the Debit Credit Transaction", The Tandem Performance Group, 1988, pp. 337-341.
Chaudhuri, Surajit et al., "Including Group-By in Query Optimization," Proceedings of the $20^{th}$ VLDB Conference—1994, pp. 354-366.
Galindo-Legaria, Cesar et al., "Outerjoin Simplification and Reordering for Query Optimization," ACM Transactions on Database Systems, vol. 22, No. 1, Mar. 1997, pp. 43-74.
Erickson, Gail et al., "Improving Performance with SQL Server 2000 Indexed Views," Microsoft TechNet, Sep. 2000, located on the internet at http://www.microsoft.com/technet/prodtechnol/sql/2000/maintain/indexvw.mspx?pf=true, retrieved on Nov. 11, 2006, 14 pages.
Mishra, Priti et al., "Join Processing in Relational Databases," ACM Computing Surveys, vol. 24, No. 1, Mar. 1992, pp. 63-113.
Muralikrishna, M., "Improved Unnesting Algorithms for Join Aggregate SQL Queries," Proceedings of the $18^{th}$ VLDB Conference—1992, pp. 91-102.
Seshadri, Preveen, "Cost-Based Optimization for Magic: Algebra and Implementation," Sigmond '96, 1996 ACM 0-89791-794-4, pp. 435-446.
Deutsch, Alin et al., "Minimization and Group-By Detection for Nested XQueries", University of California, San Diego, 2003, 15 pages.
Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.
Chaudhuri, Surajit, "An Overview of Query Optimization in Relational Systems", Microsoft Research, 1998, 10 pages.
Muralikrishna, M., "Improved Unnesting Algorithms for Join Aggregate SQL Queries", VLDB Conference, Canada, 1992, 12 pages.
Hayu, John, "Analytic SQL Features in Oracle9i", An Oracle Technical White Paper, Dec. 2001, 32 pages.
Oracle, "Optimizer Modes, Plans Stability, and Hints", Oracle8i Tuning Release 8.1.5 A67775-01, Oracle Website, 1999, 54 pages.

Lu, Hongjun, et al., "Dynamic and Load-balanced Task-Oriented Database Query Processing in Parallel Systems", Springer Berlin/Heidelberg, "Advances in Database Technology—EDBT", 1992, 19 pages.

Srivastava, J .et al., "Optimizing Multi-Join Queries in Parallel Relational Databases" Jan. 20-22, 1993, pp. 84-92. Download: http://ieeexplore.ieee.org/stamp/stamp.jsp?arnumber=00253067.

Lin, X. et al., "Using Parallel Semi-Join Reduction to Minimize Distributed Query Response Time" Algorithms and Architectures for Parallel Processing, Apr. 19-21, 1995,. vol. 2, pp. 517-526. Download: http://ieeexplore.ieee.org/stamp/stamp.jsp?arnumber=00472236.

Salminen, Ari et al., "Requirements for XML Document Database Systems" Dept. Of Computer Science and Information Systems, University of Jwaskya, 2001, pp. 85-94.

Bohannon, Philip et al., From XML Schema to Relations: A Cost-Based Approach to XML Storage, Bell Laboratories, Proc of the 18th International Conference on Data Engineering, IEEE, 2002, pp. 1-28.

Li, C. et al., "Minimizing View Sets without Losing Query-Answering Power" 2001, Springer, pp. 99-113.

Mumick, I. et al., "Maintenance of Data Cubes and Summary Tables in a Warehouse", ACM 1997, pp. 100-111.

Kemp et al., "Improving Federated Database Queries Using Declarative Rewrite Rules for Quantified Subqueries," Journal of Intelligent Information Systems, Dec. 2001. vol. 17, Iss. 2-3; pp. 281-299.

U.S. Appl. No. 10/920,973, filed Aug. 17, 2004, Notice of Allowance, Correspondence Mailing Date May 27, 2010.

U.S. Appl. No. 11/728,650, filed Mar. 26, 2007, Notice of Allowance, Correspondence Mailing Date Jul. 9, 2010.

Crestana et al., "Consistent Schema Version Removal: An Optimization Technique for Object-Oriented View", 2000.

R. Bourret et al., "A Generic Load/Extract Utility for Data Transfer Between XML Documents and Relational Databases", Department of Computer Science, Darmstadt, Germany, 2000.

Kanne et al., "Efficient stoage of XML data", In Proceedings of the 16th International Conference on Data Engineering, 2000.

U.S. Appl. No. 11/728,650, filed Mar. 26, 2007, Final Office Action, Correspondence Mailing Date Jan. 28, 2010.

U.S. Appl. No. 11/237,040, filed Sep. 27, 2005, Interview Summary, Correspondence Mailing Date Feb. 16, 2010.

* cited by examiner

DELAYING EVALUATION OF EXPENSIVE EXPRESSIONS IN A QUERY

RELATED APPLICATIONS

This application is related to U.S. patent application Ser. No. 10/874,400, entitled "Multi-Tier Query Processing", filed by Rafi Ahmed on Jun. 22, 2003, the contents of which are herein incorporated by reference for all purposes as if originally set forth herein, referred to herein as to '2465.

This application is related to U.S. patent application Ser. No. 10/920,973, entitled "SELECTING CANDIDATE QUERIES", filed by Rafi Ahmed on Aug. 17, 2004, the contents of which are herein incorporated by reference for all purposes as if originally set forth herein, referred to herein as to '2469.

This application is related to U.S. Pat. No. 5,857,180, entitled "METHOD AND APPARATUS FOR IMPLEMENTING PARALLEL OPERATIONS IN A DATABASE MANAGEMENT SYSTEM", issued to Gary Hallmark and Daniel Leary on Jan. 5, 1999, the contents of which are herein incorporated by reference for all purposes as if originally set forth herein, referred to herein as to '180.

FIELD OF THE INVENTION

The present invention relates to query processing, and more particularly, to optimizing execution of queries.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Relational and object-relational database management systems store information in tables, where a piece of data is stored at a particular row and column. To retrieve data, queries that request data are submitted to a database server, which evaluates the queries and returns the data requested.

Queries submitted to the database server must conform to the syntactical rules of a particular query language. One popular query language, known as the Structured Query Language (SQL), provides users a variety of ways to specify information to be retrieved. In SQL and other query languages, queries may have expensive expressions, particularly expensive predicates, which may, for example, take the form of subquery expressions, user-defined operators, PL/SQL functions, or other types of expressions that are relatively expensive to evaluate.

Consider a query statement, Q1, as follows

```
SELECT prod_id
FROM (SELECT prod_id
    FROM Prod_id_table
    WHERE P_expensive_1) prod_id_view
WHERE P_cheap;
```

Q1 is a containing query with respect to the subquery within the parentheses. Q1 has a filter predicate, P_cheap.

The subquery within the parentheses in Q1 has a filter predicate in the subquery "WHERE" clause. The term "filter predicate" refers to any non-join predicate. This filter predicate in the subquery has an expensive expression, P_expensive_1, which may, for example, take a form as follows:

```
(prod_name IN (SELECT prod_name
    FROM Prod_name_table
    WHERE Prod_source = 'mega_supplier'))
```

A technique for evaluating queries, referred to herein as the early evaluation technique, evaluates filter predicates as early as possible, in order to reduce the amount of data processed in later operations such as sorts and joins.

The early evaluation technique, however, is not optimal if filter predicates comprise expensive expressions, as the filter predicates will be evaluated for every row in a table at the outset of the query execution and this evaluation may be exorbitantly expensive if the table contains a large number of rows, such as millions. While early evaluation may theoretically reduce the number of rows for later operations, this row reduction may not be worthwhile if the cost of the predicate evaluation is high. The benefit of the row reduction is further reduced if the filter predicates comprising the expensive expressions are not selective, i.e., incapable of significantly reducing the number of rows.

For example, in a query such as Q1, a subquery has a predicate relating to an expensive expression and the containing query has a "cheap" and selective predicate. A cheap predicate is a filter predicate comprising cheap expressions. The early evaluation technique is also not optimal. In Q1, the early evaluation technique requires that P_expensive_1 be evaluated for every row in Prod_id_table at the outset of the query execution. Depending on the selectivity of the predicate relating to P_expensive_1, the early evaluation technique can reduce the number of the rows processed by later operations performed during the computation of query Q1. However, the reduction may not sufficiently compensate for the high cost of evaluating P_expensive_1.

Furthermore, the early evaluation technique is not optimal in situations where an expensive expression appears in a SELECT list, instead of a predicate. Consider a query, Q2, as follows:

```
SELECT *
FROM (SELECT E_expensive (c, d)
    FROM Prod_id_table
    WHERE <predicates>) v
WHERE P_cheap;
```

Q2 contains a subquery within the parentheses. E_expensive in the subquery SELECT list is not only an expensive expression but also a function of columns c and d in table Prod_id_table.

Given Q2, no matter how selective the predicate P_cheap in the containing query may be, the early evaluation technique still evaluates E_expensive for every row in table Prod_id_table inside the subquery so long as the row satisfies the subquery predicate. As in the case of Q1, Q2 becomes costly to run in situations where table Prod_id_table contains a large number of rows that satisfy the subquery predicate.

Based on the discussion above, there is clearly a need for techniques that overcome the shortfalls of early evaluation technique.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1A:
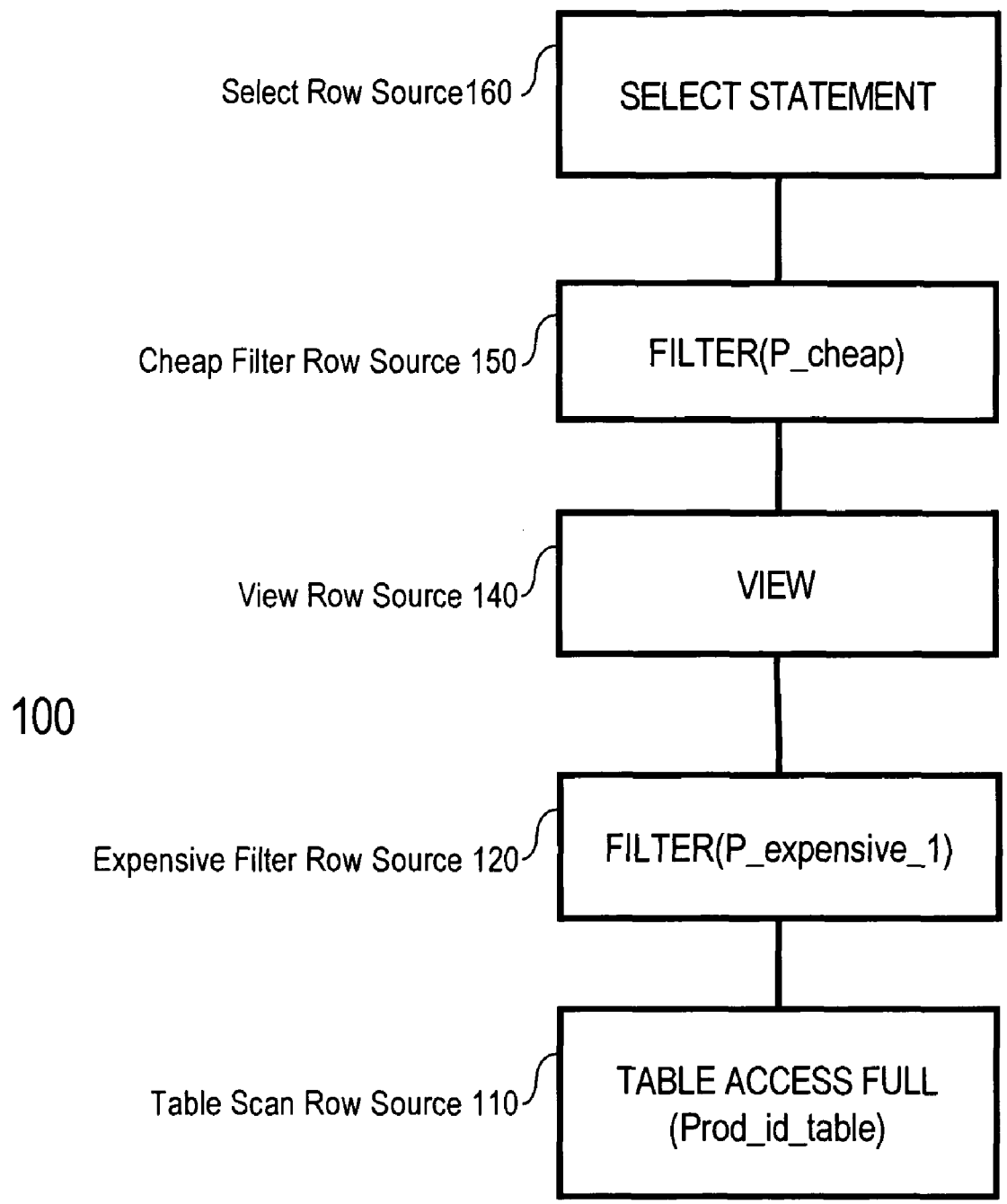
FIG. 1A shows a row source tree having a cheap predicate and a predicate relating to an expensive expression according to an embodiment of the present invention

A method and apparatus for delaying evaluations of expensive expressions in a query is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

According to an embodiment of the present invention, after an execution plan is determined by using the early evaluation technique, an operation evaluating an expensive expression in the execution plan is identified. In addition, a non-empty set of operations not evaluating the expensive expression is identified. This non-empty set of operations may include operations relating to a blocking construct such as SORT ORDER BY, WINDOW SORT, GROUP BY SORT or DISTINCT SORT.

More equivalent execution plans are generated in which the operation evaluating the expensive expression is delayed relative to the non-empty set of operations not evaluating the expensive expression. In addition, other non-parallelized equivalent execution plans are generated in which the operation evaluating the expensive expression is not delayed, for example, by pushing down a predicate based on an expensive expression. More equivalent execution plans can also be generated through parallel optimization of serial execution plans obtained in the previous steps.

Finally, based on a set of criteria, which may include comparing cost information among all the equivalent execution plans generated, an execution plan is chosen for the query.

Row Source Tree

An execution plan defines steps for executing a query. In an embodiment of the present invention, the steps of an execution plan are referred to herein as row sources. An execution plan may be generated by a query optimizer. A query optimizer evaluates a query statement such as an SQL statement, identifies possible execution plans, and selects an optimal execution plan.

One technique of representing an execution plan is a row source tree. A row source tree is composed of row sources. When describing an execution plan and its execution, it is convenient to refer to the operations represented by a row source as the row source, or the execution of those operations as execution of the row source. For example, stating that row source X filters rows is just a convenient way of stating that the filter operation represented by row source X filters rows.

A row source represents one or more operations that manipulate rows to generate another set of rows. Examples of operations represented by row sources include: count, filter, join, sort, union, and table scan. Other row sources can be used without exceeding the scope of the present invention.

Each row source in a row source tree is linked to zero, one, two, or more underlying row sources. The makeup of a row source tree depends on the query and the decisions made by the query optimizer during the compilation process. Typically, a row source tree is comprised of multiple levels. The lowest level, the leaf nodes, access rows from a database or other data store. The top row source, the root of the tree, produces, by composition, the rows of the query that the tree implements. The intermediate levels perform various transformations on rows produced by underlying row sources.

For example, a query optimizer implementing the early evaluation technique typically produces an execution plan, EP11, for query Q1, as follows:

```
SELECT STATEMENT
FILTER(P_cheap)
  VIEW
    TABLE ACCESS FULL(Prod_id_table) + FILTER(P_expensive_1)
```

FIG. 1A shows a row source tree 100 representing the execution plan, EP11, according to one embodiment of the present invention. Row source tree 100 is made of row sources 110-160. As the traversal of row source tree goes from the bottom up, the operation represented by table scan row source 110, a full table scan, is the first to be executed. The rows generated from this operation are input into expensive filter row source 120.

Expensive filter row source 120 filters each input row from table scan row source 110, producing only those rows for which P_expensive_1 is TRUE. View row source 140 passes as many rows as it receives to the row source further up, cheap filter row source 150, without waiting. Those rows satisfying FILTER(P_cheap)—i.e., P_cheap is evaluated to be TRUE—eventually become the input to the top row source, select row source 160. Select row source 160 evaluates expressions on its SELECT list for each input row and produces the entire query result.

Figure 1B:
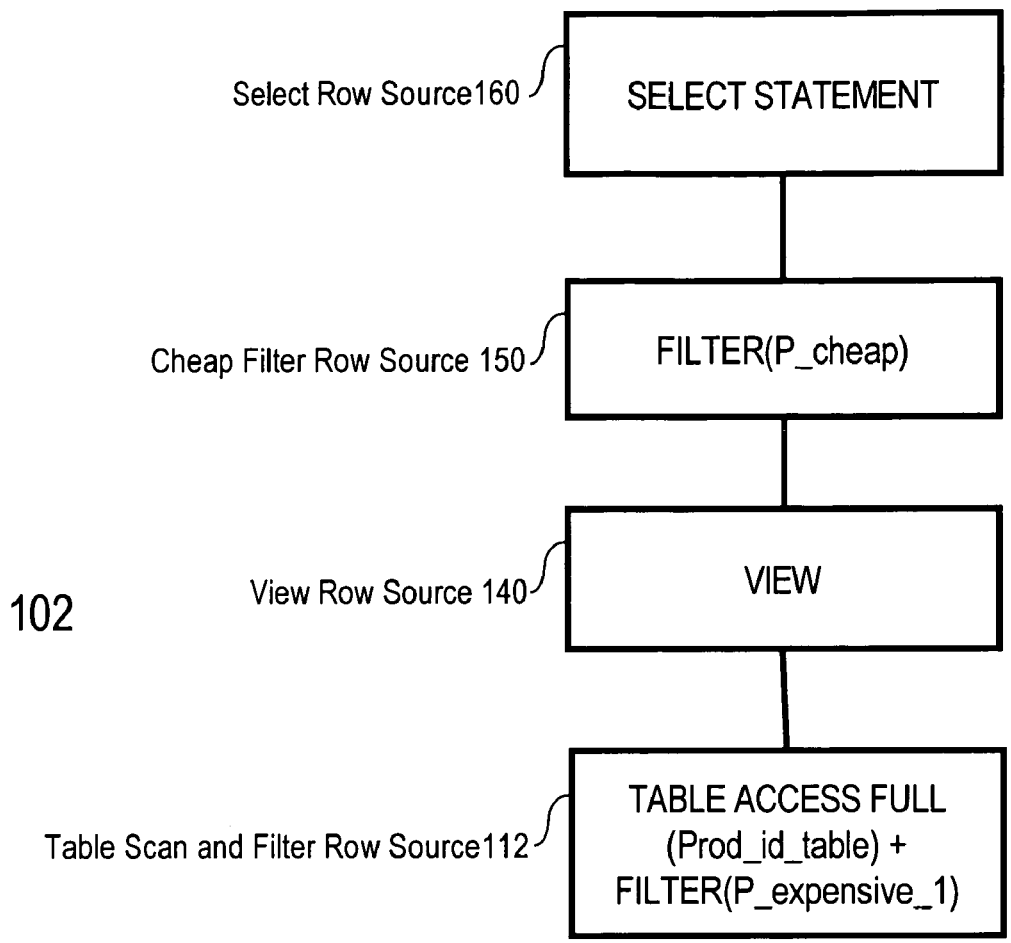
FIG. 1B shows a row source tree where a row source may represent more than one operation according to an embodiment of the present invention.

According to one embodiment, a single row source may represent multiple operations. FIG. 1B shows such a row source tree, 102, representing an equivalent query execution plan to EP11. Row source tree 102 is the same as row source tree 100, except that, in row source tree 102, two operations, the full table scan and the filter evaluating P_expensive_2, are now combined into a single row source, table scan and filter row source 112.

In order to understand how an operation such as a filter predicate may be delayed in the context of a row source tree, it is important to understand first the ancestral order of a row source tree. The ancestral order for a row source tree is from the top down, starting from the root node such as select row source 160 in FIG. 1A.

Now consider two operations that are represented by two row sources respectively. In a first case, if one row source is a descendant of the other, then the operation represented by the descendant row source occurs, or is executed, before the other operation represented by the ancestor row source. In a second case, if the two row sources, e.g., siblings or cousins, do not constitute an ancestor-descendant relationship, then the operation represented by one row source may occur, or be executed, before, after, or at the same time as the other operation represented by the other row source. In the first case, the operation represented by the descendant row source is said to be no later than the operation represented by the ancestor row source. In the second case, either operation is said to be no later than the other operation.

Alternatively, consider two operations that are represented by a single row source, e.g., 112 in FIG. 1B. It is possible that the two operations may have a particular temporal order within a particular implementation of the row source. However, as far as the traversal of row source tree is concerned, the two operations are combined into a single row source. Either operation is referred to as being no later than the other operation regardless of how the two operations are actually implemented in the row source.

For example, in row source tree 100, filter row source 120 represents a filter operation based on P_expensive_1. This filter operation occurs before all but one operation, TABLE ACCESS FULL. Thus the filter operation occurs no later than all but that one operation. In particular, consider a set of operations not evaluating P_expensive_1: VIEW and FILTER(P_cheap). The row sources corresponding to this set of two operations are ancestors with respect to filter row source 120. Furthermore, this set of two operations is non-empty as it has at least one member. Thus, the filter operation is said to occur no later than this set of two operations.

Similarly in row source tree 102, table scan and filter row source 112 represents a filter operation based on P_expensive_1. This filter operation occurs no later than all operations. In particular, consider a set of operations not evaluating P_expensive_1: TABLE ACCESS FULL and VIEW and FILTER(P_cheap). The row sources corresponding to this set of three operations are either scan and filter row source 112, view row source 140 and filter row source 150. This set of three operations is non-empty as it has at least one member. Thus, the filter operation is said to occur no later than this set of three operations.

Transformation of Execution Plan

A change to a row source tree—such as insertion of a new row source, or deletion or modification of an existing row source—produces an alternative execution plan. For example, row source tree 102 in FIG. 1B derives from a change to row source tree 100 in FIG. 1A. Transformation from row source tree 100 to row source tree 102 is accomplished by deletion of table scan row source 110 and filter row source 120 plus insertion of table scan and filter row source 112. Alternatively, the same transformation can be accomplished by deletion of filter row source 120 plus modification of table scan row source 110 (with a new label 112). At any rate, if an execution plan and its derived alternative execution plan can both correctly compute a query, then the two execution plans are said to be equivalent, or semantically equivalent.

Delaying evaluation of an expensive expression means to delay the operation evaluating the expensive expression relative to a set of one or more operations that are not evaluating the expensive expression. Between alternative row source trees, this is accomplished by moving a row source for an expensive expression from a position as a descendant row source to that of an ancestor row source relative to another row source.

According to one embodiment, expressions can be established as expensive if their evaluation at the runtime of the query execution is estimated at the compile time to require relatively more resource usage to process because, for example, processing the expression involves frequent disk access, places relatively large demands on volatile memory, requires communications with remote systems, or consumes many CPU cycles. Conversely, expressions can be established as cheap if their evaluation at the runtime of the query execution is estimated at the compile time to require relatively less resource usage to process.

What constitutes a resource and what constitutes more or less, frequent or infrequent, large or small usage of the resources can be configured, for example, by a database administrator through a file stored in a computer accessible medium. In one embodiment, a list of expensive expressions such as certain PL/SQL function names is placed in a machine-readable medium accessible by the query optimizer to determine which expressions are expensive by matching with entries in the list.

In a preferred embodiment, expensive expressions in a query can also be established by using the cost information generated with a first execution plan.

Whatever method is used, that method can be used separately or in combination with other methods to establish expensive expressions in a query. Furthermore, depending on embodiments of the present invention, the establishment of expensive expressions may proceed before, after or at the same time as the generation of a first execution plan.

Pull-up for Query with Expensive Predicated in Subquery

Queries in which an expensive expression appears in a filter predicate within a subquery may be transformed using a predicate pull-up technique. The expensive predicate in the subquery can be pulled up to a position above the cheap and selective predicate in the containing query. The predicate pull-up technique in effect pulls the predicate in the subquery up to the containing query, creating a new, transformed execution plan. A difference between the transformed execution plan and the untransformed execution plan is this: the transformed execution plan delays the operation evaluating the expensive expression relative to a set of operations not evaluating the expensive expression. Between the row source tree representing the transformed execution plan and the row source tree representing the untransformed execution plan, the row source evaluating the expensive expression becomes an ancestor to the row sources corresponding to the set of operations not evaluating the expensive expression.

For example, applying the predicate pull-up technique to EP11 produces an equivalent execution plan, EP12, as follows:

```
SELECT STATEMENT
  FILTER(P_expensive_1)
    FILTER(P_cheap)
      VIEW
        TABLE ACCESS FULL(Prod_id_table)
```

Figure 1C:
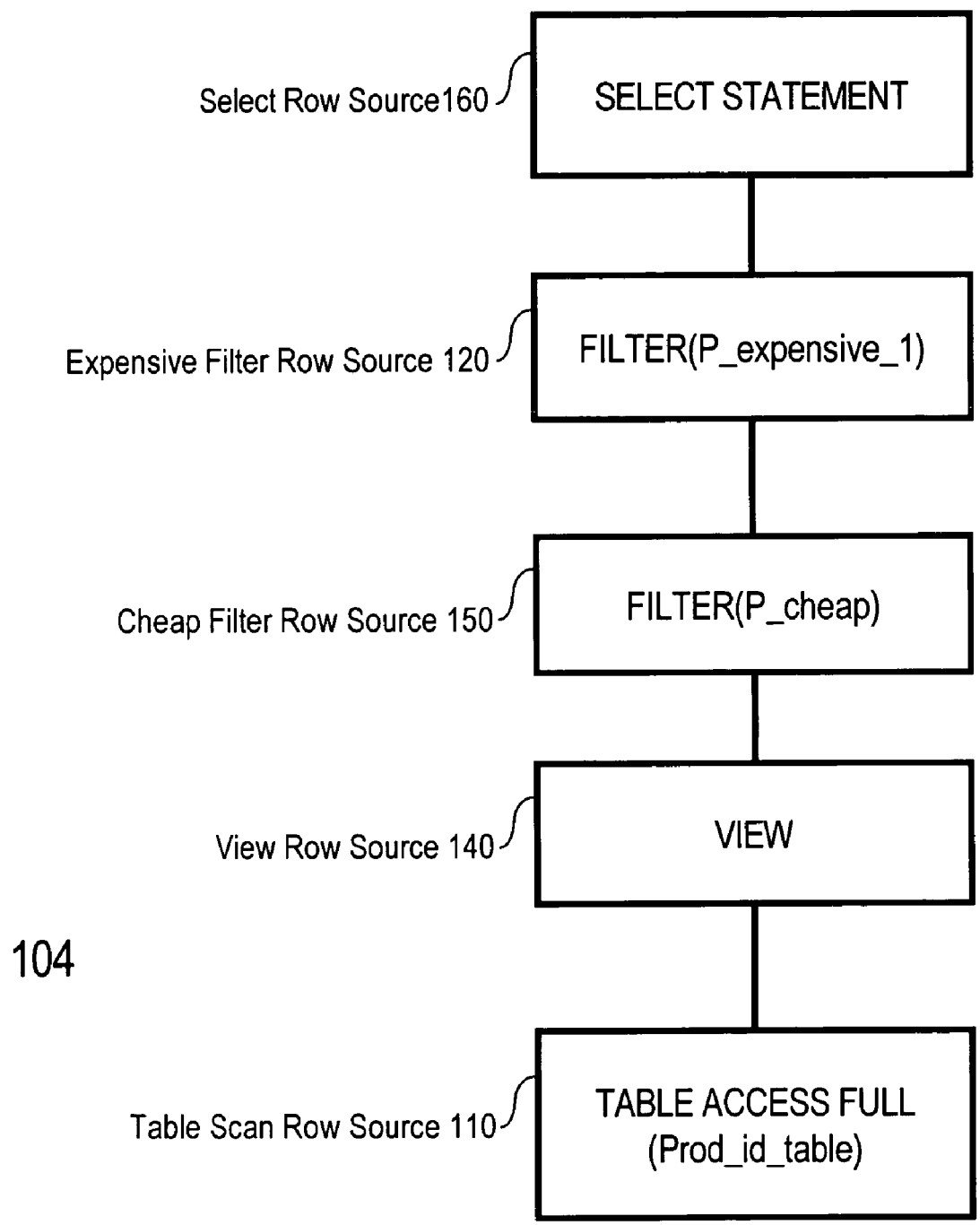
FIG. 1C shows a row source tree having a cheap predicate and a predicate relating to an expensive expression where an operation evaluating the expensive expression has been delayed relative to the row source tree in FIG. 1A according to an embodiment of the present invention.

FIG. 1C shows a row source tree 104 representing the execution plan, EP12, according to one embodiment of the present invention. Row source tree 104 is made of the same row sources as in row source tree 100 in FIG. 1A. A difference between the two trees in FIGS. 1A and 1C is the position of expensive filter row source 120, which filters rows based on P_expensive_1. In row source tree 100 in FIG. 1A, the filter operation occurs no later than the set of two operations VIEW and FILTER(P_cheap). In row source tree 104 in FIG. 1C, on the other hand, the filter operation is delayed relative to this set of two operations.

Delayed evaluation of an expensive expression can produce a much cheaper execution plan—one that, for example, involves less disk access, places relatively small demands on volatile memory, reduces communications with remote systems, or consumes fewer CPU cycles.

In row source tree 100, expensive filter row source 120 must filter every row in Prod_info_table. In contrast, in row source tree 104, expensive filter row source 120 filters a smaller set of rows in Prod_info_table after cheap filter row source 150 has filtered its input rows based on P_cheap. EP12 tends to perform better when 1) the number of times the P_expensive_1 filter is executed is small in EP12, 2) the P_cheap filter is very selective, and 3) the P_expensive_1 filter is not very selective.

Expensive Expression in Subquery Select List

For queries where an expensive expression appears in a SELECT list within a subquery, the delaying evaluation technique can be used to in effect pull the expensive expression to the SELECT list of the containing query. For example, consider Q2. The early evaluation technique typically produces an execution plan, EP21, as follows:

```
SELECT STATEMENT
  FILTER(P_cheap)
    VIEW(E_expensive)
      TABLE ACCESS FULL(Prod_id_table)
```

Figure 2A:
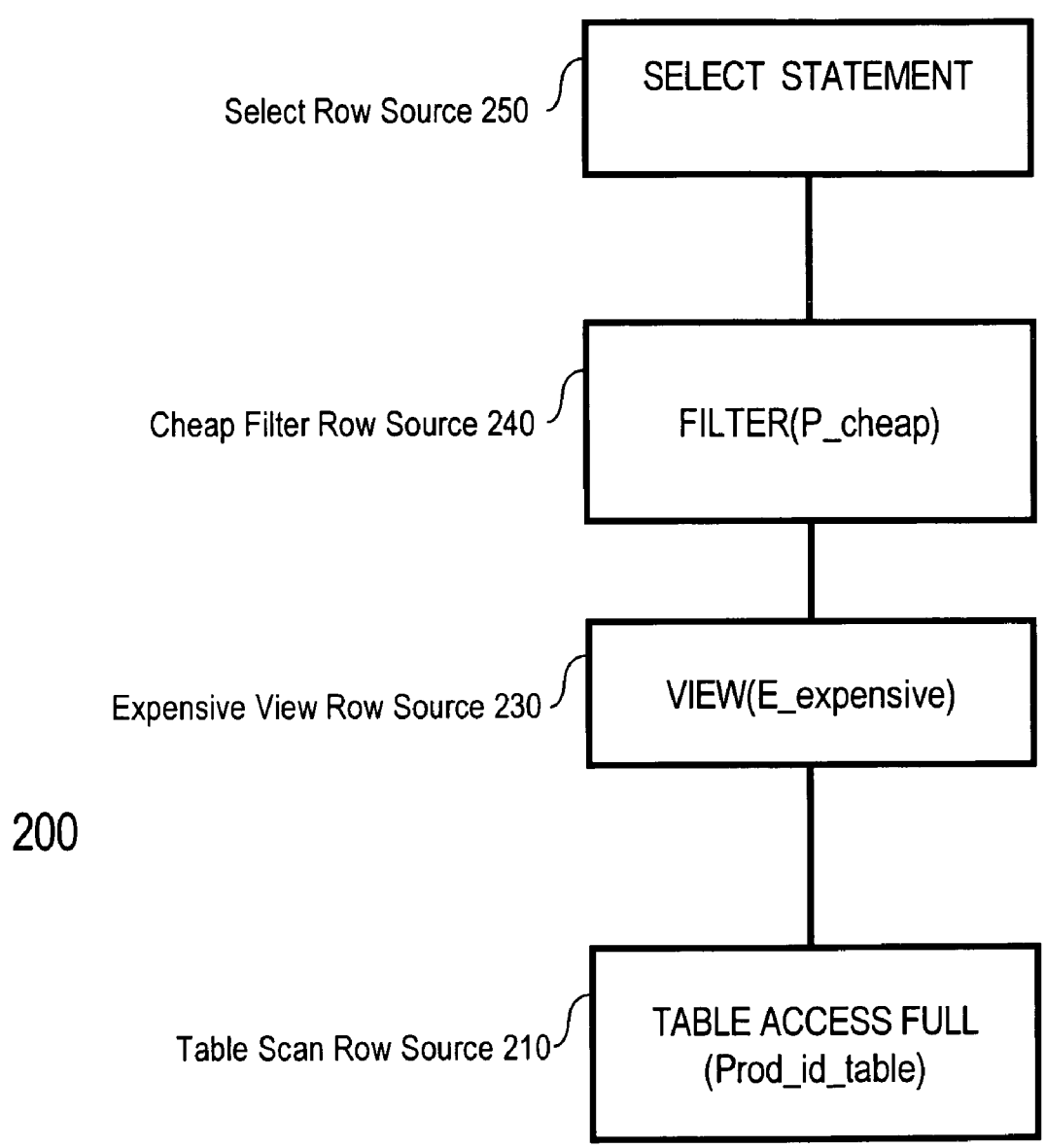
FIG. 2A shows a row source tree having a cheap predicate and an expensive expression in a SELECT list according to an embodiment of the present invention.

FIG. 2A shows a row source tree 200 representing the execution plan, EP21, according to one embodiment of the present invention. Row source tree 200 is made of row sources 210-250. As before, the bottom table scan row source 210, a full table scan, is the first to be executed. The rows generated from this operation feed into the expensive view row source 230.

The expensive view row source 230 evaluates E_expensive as part of the SELECT list in the view created by the subquery. Those rows are passed further up to cheap filter row source 240. Cheap filter row source 240 filters the rows based on P_cheap and directs all the output rows to the top row source, select row source 250. Finally, select row source 250 evaluates expressions on its SELECT list for each input row and produces the entire query result.

Applying the delaying evaluation technique to EP21 produces an equivalent execution plan, EP22, as follows:

```
SELECT STATEMENT(E_expensive)
  FILTER(P_cheap)
    VIEW
      TABLE ACCESS FULL(Prod_id_table)
```

Figure 2B:
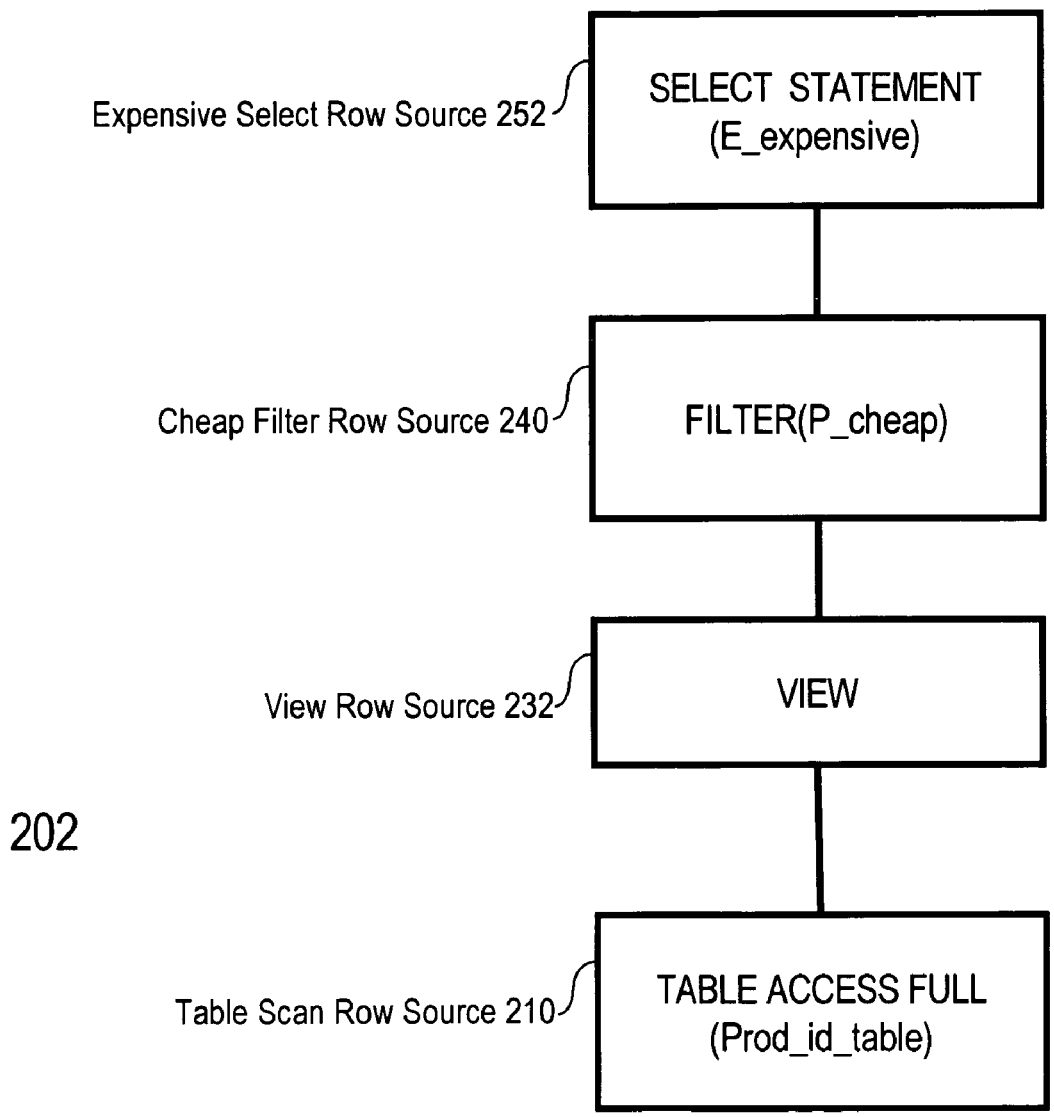
FIG. 2B shows a row source tree having a cheap predicate and an expensive expression in a SELECT list where an operation evaluating the expensive expression in a SELECT list has been delayed relative to the row source tree in FIG. 2A according to an embodiment of the present invention.

FIG. 2B shows a row source tree 202 representing the execution plan, EP22, according to one embodiment of the present invention. A difference between row source trees 200 and 202 in FIGS. 2A and 2B is the position of the row source evaluating E_expensive. In row source tree 200 in FIG. 2A, the operation evaluating E_expensive occurs no later than the set of two operations FILTER(P_cheap) and SELECT STATEMENT. In row source tree 202 in FIG. 2B, on the other hand, the operation evaluating E_expensive is delayed relative to this set of two operations. In the transformed row source tree, 202, the operation evaluating E_expensive is part of expensive select row source 252, which represents the SELECT STATEMENT operation, while, in row source tree 200, the operation evaluating E_expensive is part of expensive view row source 230, which represents the VIEW operation.

In row source tree 200, expensive view row source 230 evaluates E_expensive for every row in the view created by a full table scan of Prod_info_table. In contrast, in row source tree 202, the operation evaluating E_expensive has been delayed after the operation evaluating P_cheap. Hence, EP22 tends to perform better when 1) the number of times E_expensive is evaluated is small in EP22 and 2) P_cheap filter is very selective.

Rownum Predicate in Containing Query

Some queries have an expensive expression that appears in a filter predicate within a subquery and a ROWNUM predicate that appears in the containing query. The ROWNUM predicate can represent a special case of a cheap and selective predicate.

Consider a query statement, Q3, as follows

```
SELECT prod_id
FROM (SELECT prod_id
    FROM Prod_id_table
    WHERE P_expensive_2
    ORDER BY relevance) prod_id_view
WHERE ROWNUM <= 10;
```

Q3 is a containing query with respect to the subquery within the parentheses. Q3 also has a ROWNUM predicate in the form of $$ROWNUM < [=] k$$

The ROWNUM pseudocolumn returns a number indicating the order in which Oracle database selects the row from a table or set of joined rows. A ROWNUM predicate serves a similar role to the TOP keyword in ANSI SQL, and retrieves the first k (or k−1, in the "<" case) rows of a table or view.

Figure 3A:
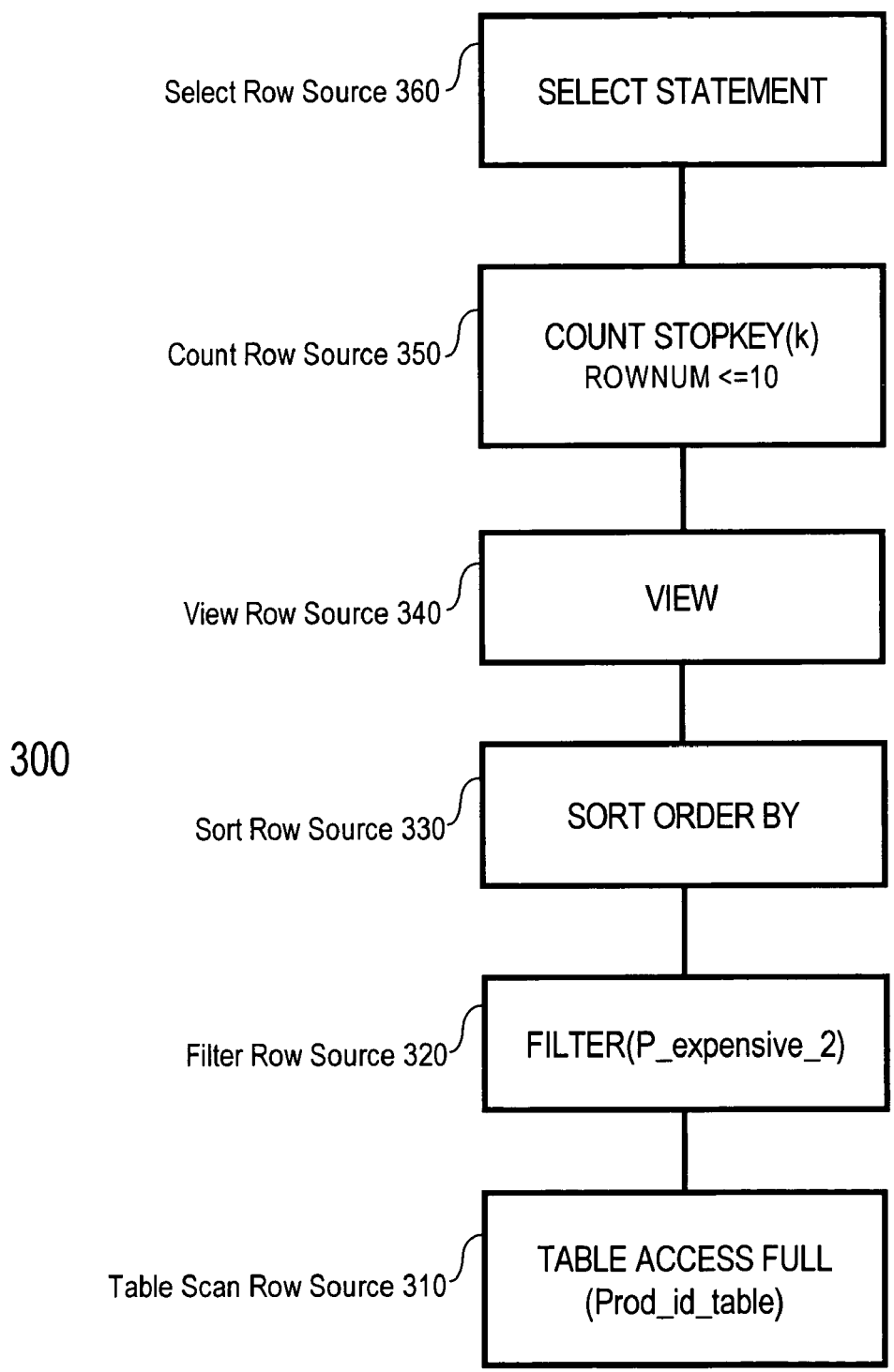
FIG. 3A shows a row source tree having a ROWNUM predicate and a predicate relating to an expensive expression where each row source represents an operation according to an embodiment of the present invention.

FIG. 3A shows a row source tree 300 representing the execution plan, EP31, according to one embodiment of the present invention. Row source tree 300 is made of row sources 310-360. As the traversal of row source tree goes from the bottom up, the operation represented by table scan row source 310, a full table scan, is the first to be executed. The rows generated from this operation are input into filter row source 320.

Filter row source 320 filters each input row from table scan row source 310, producing only those rows for which P_expensive_2 is TRUE. Filter row source 320 is not a blocking operation, meaning that the row source further up, in this case, sort row source 330, can consume rows produced by the lower row source, in this case, filter row source 320, in a row-by-row manner. Sort row source 330 is a blocking operation. A blocking operation requires all input from descendant row sources before providing output to a row source further up. Thus, the row source further up from row source 330, which is view row source 340, is blocked from obtaining any input row until the sorting in the lower sort row source 330 is completed.

Like filter row source 320, view row source 340 is not a blocking construct and can pass as many rows as produced to the row source further up, count row source 350, without waiting. But, since count row source 350 represents the ROWNUM predicate in the containing query, view row source 340 is told to only produce the first 10 rows from its view. Those first 10 rows eventually become the input to the top row source, select row source 360. Select row source 360 simply evaluates expressions on its SELECT list for each input row and produces the entire query result.

Applying Predicate Pull-up to ROWNUM Query

By applying the predicate pull-up technique, the predicate relating to the expensive expression can be pulled up to a position under the ROWNUM predicate in the containing query.

For example, filter row source 320 in FIG. 3A can be pulled up above sort row source 330 and under count row source 350. Correspondingly, this produces a transformed execution plan, EP32, which is equivalent to EP31, as follows:

```
SELECT STATEMENT
COUNT STOPKEY(k)
VIEW + FILTER(P_expensive_2)
```

```
SORT ORDER BY
    TABLE ACCESS FULL(Prod_id_table)
```

Figure 3B:
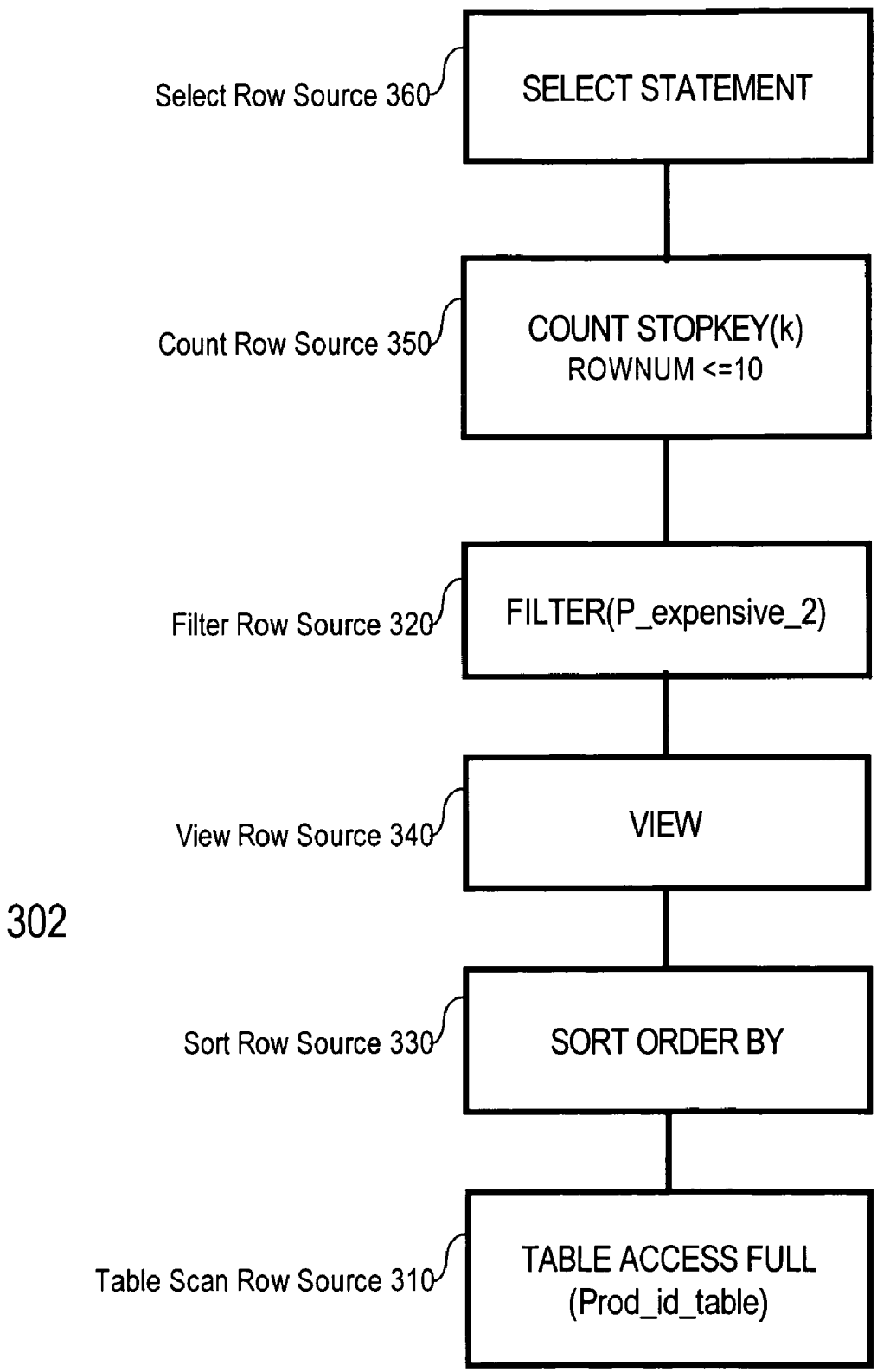
FIG. 3B shows a row source tree having a ROWNUM predicate and a predicate relating to an expensive expression where the predicate relating to the expensive expression has been delayed relative to FIG. 3A according to an embodiment of the present invention.

FIG. 3B shows a row source tree 302 representing the execution plan, EP32, according to one embodiment of the present invention. Row source tree 302 is made of the same row sources as in row source tree 300 in FIG. 3A. A difference between the two trees is the position of filter row source 320, which is a filter operation based on P_expensive_2. In row source tree 300 in FIG. 3A, the filter operation occurs no later than the set of two operations, VIEW and SORT ORDER BY. In row source tree 302 in FIG. 3B, on the other hand, the filter operation is delayed relative to the set of two operations.

The delayed evaluation produces a much cheaper execution plan. In row source tree 300, filter row source 320 must filter every row in Prod_info_table. In contrast, in row source tree 302, filter row source 320 is informed by its consumer count row source 350 to produce only 10 rows. Filter row source 320 in row source tree 302, in turn as a consumer row source, tells its producer view row source 340 to produce only as many rows as necessary for filter row source 320 to produce the first 10 rows satisfying the P_expensive_2 filter. Hence, EP32 tends to perform better when 1) the number of times the P_expensive_2 filter is executed is small in EP32, 2) the ROWNUM predicate is very selective, and 3) the P_expensive_2 filter is not very selective, since the reduction in amount of data for later operations is not very significant in EP31.

Delaying an Operation for ROWSOURCE Representing Two or More Operations

In an embodiment where a single row source represents multiple operations, the same delaying technique can apply to evaluation of expensive expression.

Figure 3C:
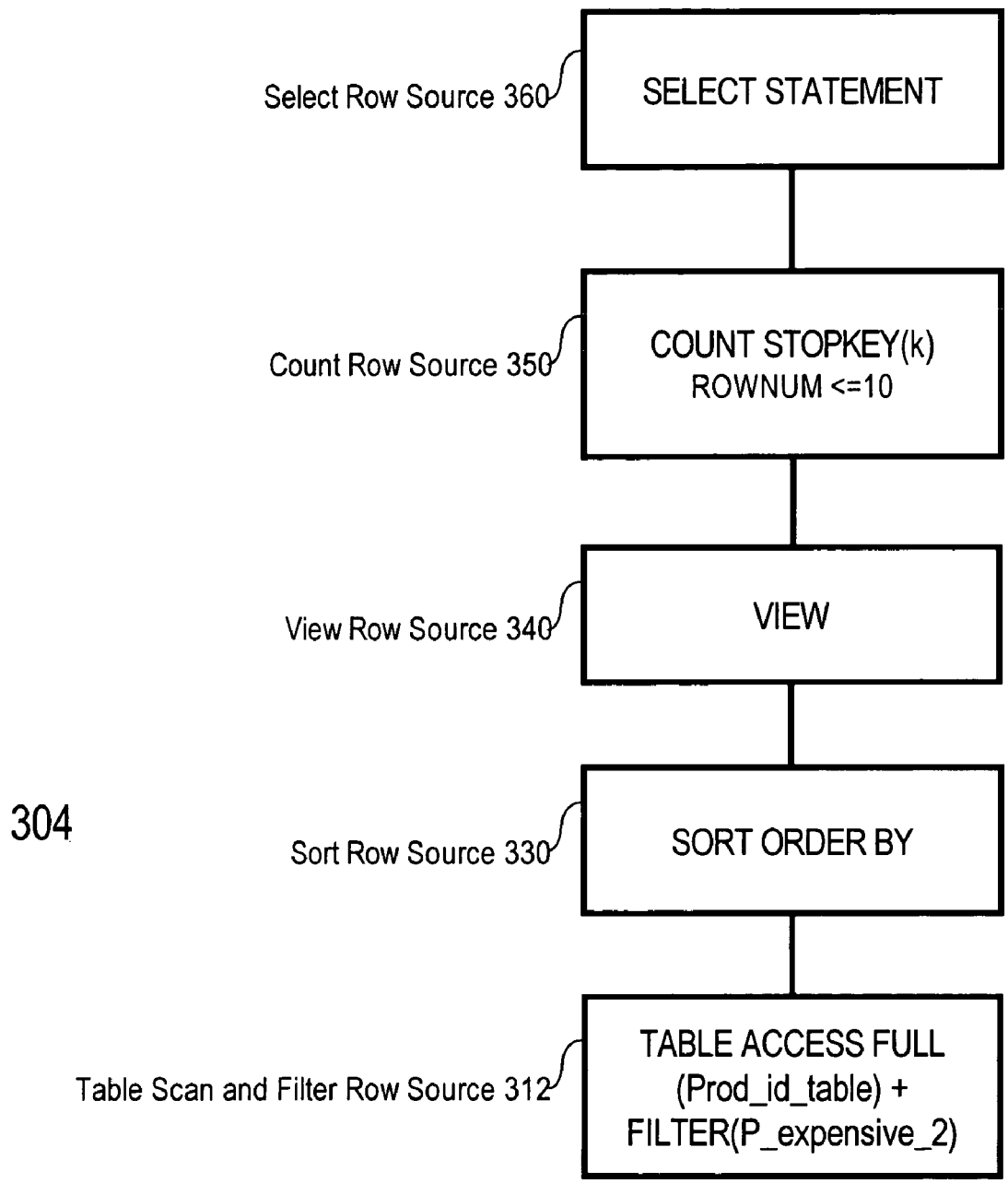
FIG. 3C shows a row source tree having a ROWNUM predicate and a predicate relating to an expensive expression where a row source may represent more than one operation according to an embodiment of the present invention.

FIG. 3C shows such a row source within a row source tree 304, representing an equivalent query execution plan to EP31. Row source tree 304 is the same as row source tree 300, except that, in row source tree 304, two operations, the full table scan and the filter evaluating P_expensive_2, are now combined into a single row source, table scan and filter row source 312.

Figure 3D:
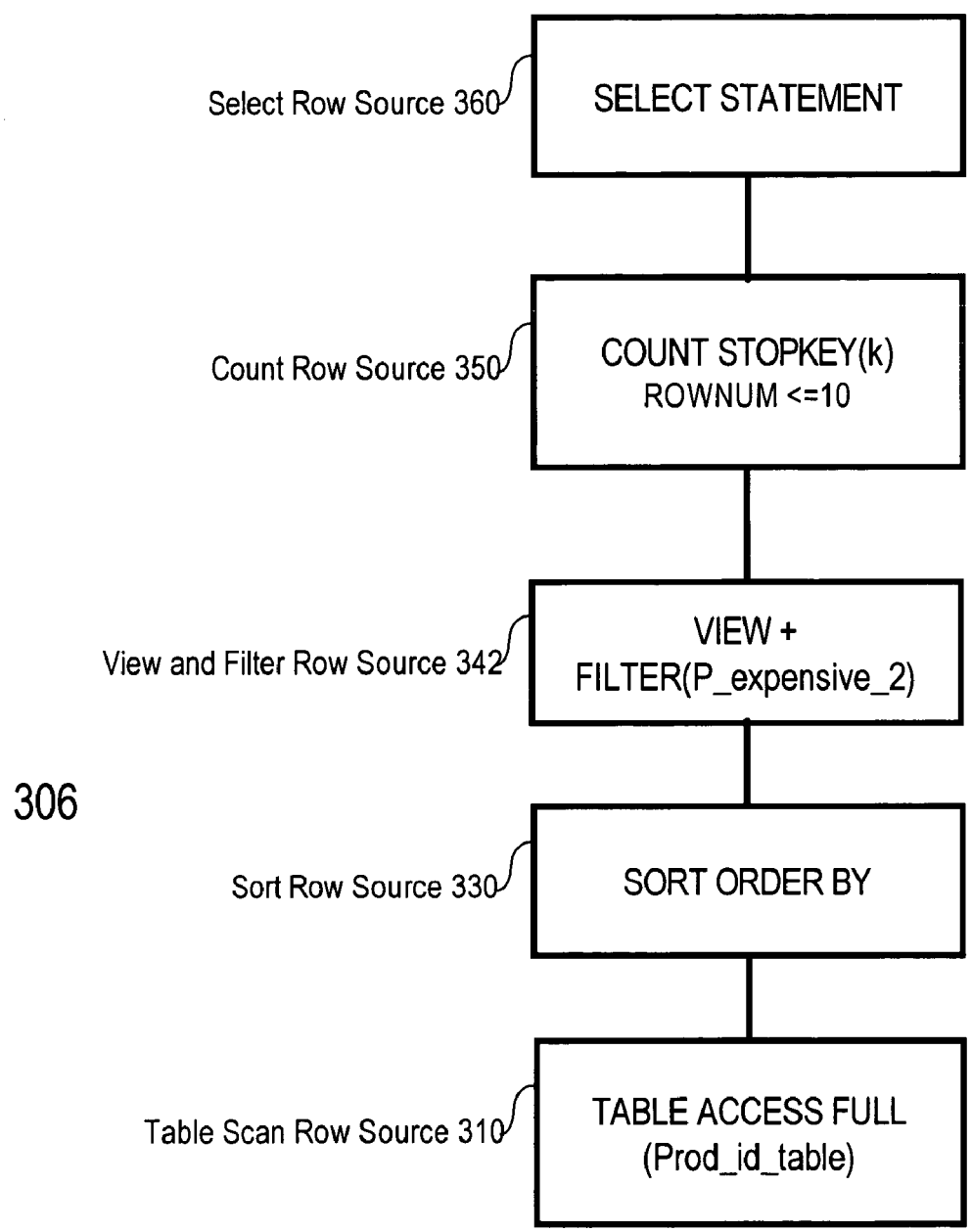
FIG. 3D shows a row source tree having a ROWNUM predicate and a predicate relating to an expensive expression where the predicate relating to the expensive expression has been delayed relative to FIG. 3C according to an embodiment of the present invention.

FIG. 3D shows an alternative row source tree 306 representing the execution plan, EP32, according to one embodiment of the present invention. A difference between the two row source trees in FIGS. 3C and 3D is the position of the row source that filters rows based on P_expensive_2. In row source tree 304 in FIG. 3C, the filter operation occurs no later than the set of three operations, TABLE ACCESS FULL, SORT ORDER BY and VIEW. In row source tree 306 in FIG. 3D, on the other hand, the filter operation is delayed relative to this set of three operations.

In row source tree 304, table scan and filter row source 312 must filter every row in Prod_info_table. In contrast, in row source tree 306, view and filter row source 342 is told by its consumer count row source 350 to produce only the first 10 rows satisfying the P_expensive_2 filter. For similar reasons mentioned with respect to row source tree 302, row source tree 306 may perform better than row source tree 304.

Other Equivalent Executions Plans

In addition to execution plans created by the early evaluation technique and equivalent execution plans created by delaying evaluation of expensive expressions, other alternative equivalent execution plans can be included in the set of execution plans from which the query optimizer ultimately chooses as the best execution plan.

For example, consider a query such as Q3, where the containing query has a ROWNUM predicate, and a subquery has an expensive expression as well as a blocking construct like an ORDER BY clause. Replicating and pushing the COUNT STOPKEY filter down into the sort required by the ORDER BY creates an execution plan to EP33 equivalent to EP31 and EP32 as follows:

```
SELECT STATEMENT
COUNT STOPKEY (k)
VIEW
SORT ORDER BY COUNT STOPKEY
TABLE ACCESS FULL(Prod_id_table) + FILTER(P_expensive_2)
```

Figure 3E:
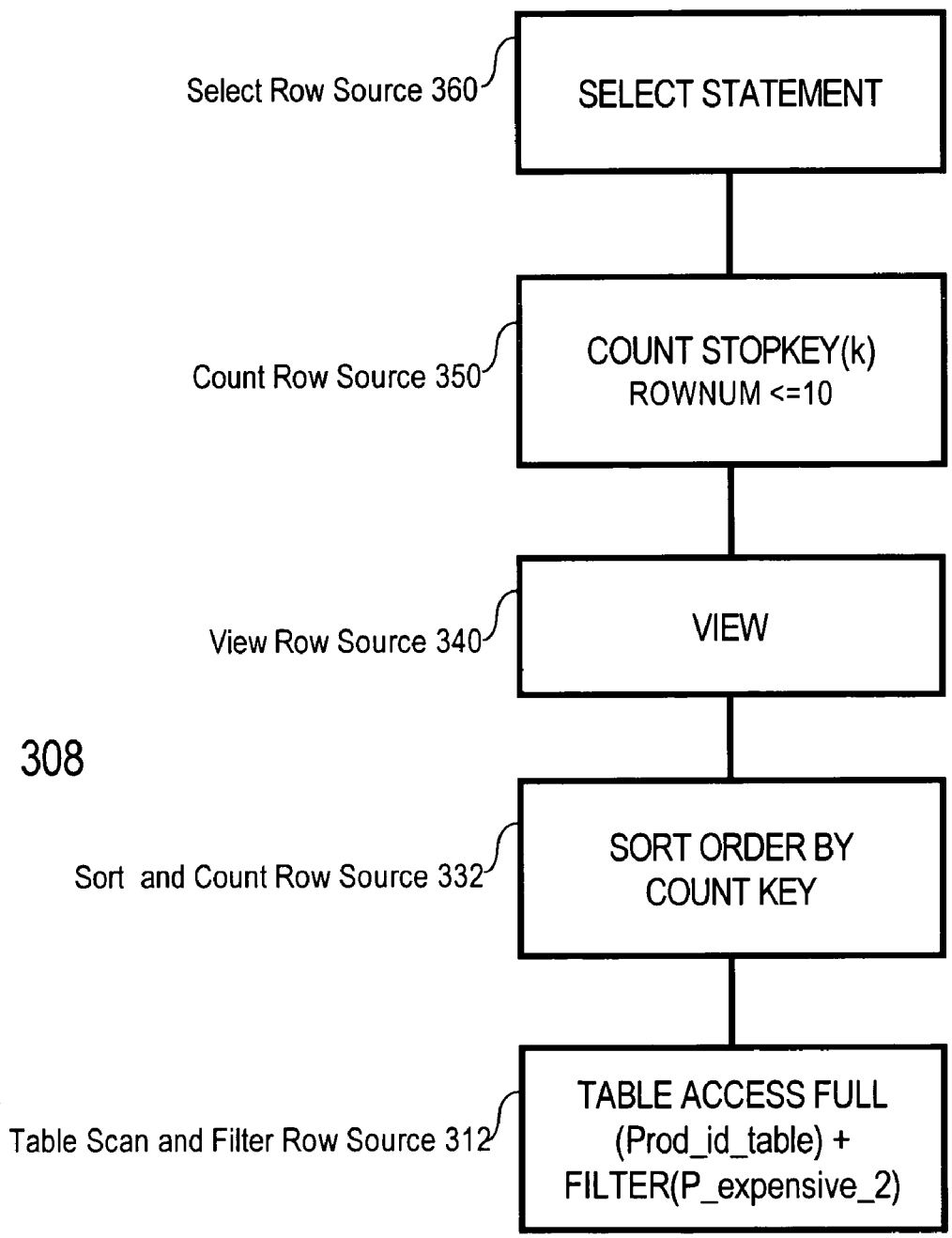
FIG. 3E shows a row source tree having a ROWNUM predicate and a predicate relating to an expensive expression where the ROWNUM predicate has been replicated and pushed down relative to the row source tree in FIG. 3C according to an embodiment of the present invention.

According to an embodiment, FIG. 3E shows a row source tree 308 representing the execution plan EP33. A difference between the two row source trees in FIGS. 3C and 3E shows up in the row sources implementing the SORT ORDER BY operation, i.e., sort row source 330 and sort and count row source 332 respectively. Sort and count row source 332 does the SORT ORDER BY operation in conjunction with the COUNT STOPKEY filter. Sort row source 330, on the other hand, does the SORT ORDER BY operation without the COUNT STOPKEY filter.

Because sort and count row source 332 includes the COUNT STOPKEY filter, the behavior of the sort operation changes. In row source tree 308, instead of doing a merge when demanded by a consumer iterator, sort and count row source 332 keeps merging sorted run while doing sorting and tries to only keep k rows in volatile memory. If k is small enough and k* row size is less than or equal to the amount of memory available for the sort, the sort does not spill to disk. By avoiding spilling the sort to disk, this type of execution plan can improve performance, as disk access is more expensive than volatile memory access. Notably in EP33, the P_expensive_2 predicate cannot be pulled up above the sort since there is no guarantee that k rows in memory after the sort would necessarily produce k rows—satisfying the P_expensive_2 predicate—as demanded by count row source 350.

As stated, the alternative equivalent execution plans produced by the technique illustrated above can be included in the set of execution plans from which the query optimizer ultimately chooses the best execution plan.

Parallel Optimizations

Parallel execution benefits systems with the following characteristics:
  a. Symmetric multiprocessors (SMPs), clusters, or massively parallel systems
  b. Sufficient I/O bandwidth
  c. Underutilized or intermittently used CPUs (for example, systems where CPU usage is typically less than 30%)
  d. Sufficient memory to support additional memory-intensive processes, such as sorts, hashing, and I/O buffers Equivalent execution plans can be found by using the parallel optimization technique in U.S. Pat. No. 5,857,180, entitled "Method and apparatus for implementing parallel operations in a database management system". The additional plans found by the parallel optimization technique can be compared with other execution plans including those created by delaying evaluation of expensive expressions.

For example, EP32 can be parallelized to produce an equivalent execution plan, EP34, as follows:

```
SELECT STATEMENT
COUNT STOPKEY (k)
PX COORDINATOR
|(parallel to serial TQ)
COUNT STOPKEY
VIEW + FILTER(P_expensive_2)
SORT ORDER BY
|(range TQ)
PX GRANULE ITERATOR
TABLE ACCESS FULL(Prod_id_table)
```

Figure 4:
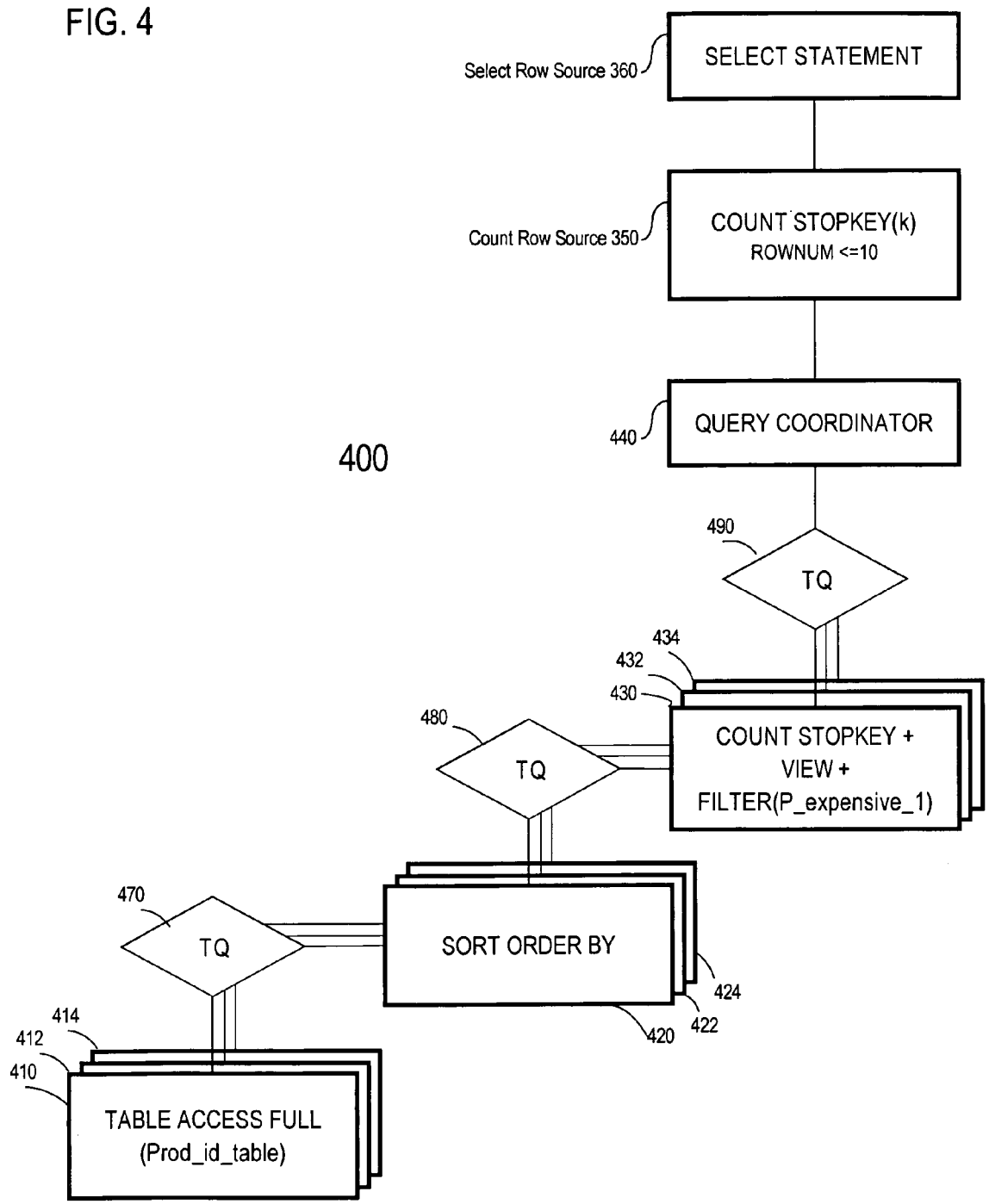
FIG. 4 shows a row source tree that has been parallelized relative to the row source tree in FIG. 3D.

According to an embodiment, FIG. 4 shows a row source tree 400 representing the execution plan, EP34, after an execution plan represented by row source tree 306 in FIG. 3D has been parallelized. Row sources below count row source 350 in the original serial execution plan EP32 have been parallelized into Data Flow Operators (DFOs) comprising Query Slaves 410-414, 420-424 and 430-434, respectively. Replacing a row source in the serial execution plan, each data flow operator has a number of query slaves work in parallel. In between those Data Flow Operators are Table Queues (TQ) 470 and 480. In addition, Table Queue 490 below Query Coordinator 440 combines multiple data inputs into a single data input. Table Queues 470, 480 and 490 move the output data from data flow operators to upper level consumers. Query Coordinator 440 passes this single data input to the row source further up, count row source 350. As in the serial execution plan, count row source 350 sends the first 10 rows to the top row source, select row source 360. Finally, select row source 360 evaluates expressions on its SELECT list for each input row and produces the entire query result.

The parallel optimization in EP34 is accompanied by a pushing of the ROWNUM predicate into the top DFO—represented by Query Slaves 430-434 in FIG. 4—with the VIEW operation so as to filter out rows in the producer Query Slaves 430-434 rather than at Query Coordinator 440. With this pushing, the communication cost between Query Coordinator 440 and Query Slaves 430-434 is reduced as the traffic between the two across Table Queue 490 is reduced. Because of the latency inherent in communicating between distributed components of a parallel processing system, it is important to minimize the communication cost in a parallel execution plan.

As a further example, using the parallel optimization technique, EP33 can be parallelized to produce an equivalent execution plan, EP35, as follows:

```
SELECT STATEMENT
COUNT STOPKEY (k)
PX COORDINATOR
|(parallel to serial TQ)
VIEW
SORT ORDER BY COUNT STOPKEY
|(range TQ)
PX GRANULE ITERATOR
TABLE ACCESS FULL(Prod_id_table) + FILTER(P_expensive_2)
```

Figure 5:
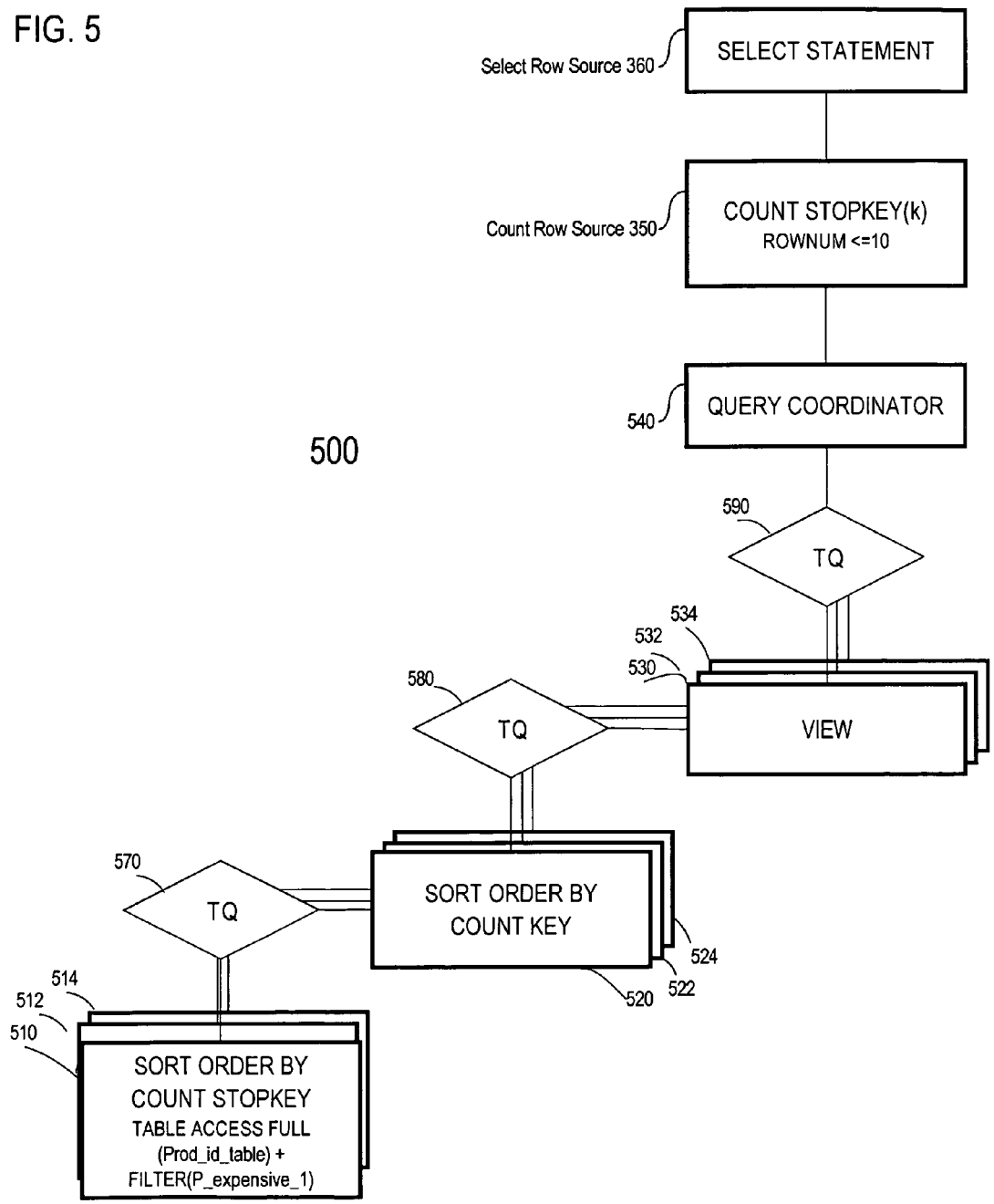
FIG. 5 shows a row source tree that has been parallelized relative to the row source tree in FIG. 3E.

According to an embodiment, FIG. 5 shows a row source tree 500 representing the execution plan, EP35, after an execution plan represented by row source tree 308 in FIG. 3E is parallelized. Row sources below count row source 350 in the original serial execution plan EP33 have been parallelized into Data Flow Operators (DFOs) comprising Query Slaves 510-514, 520-524 and 530-534, respectively. In between those Data Flow Operators are Table Queues (TQ) 570 and

580. In addition, Table Queue 590 below Query Coordinator 540 combines multiple data input into a single data input. Table Queues 570, 580 and 590 move the output data from data flow operators to upper level consumers. Query Coordinator 540 passes this single data input to the row source further up, count row source 350. As in the serial execution plan, count row source 350 sends the first 10 rows to the top row source, select row source 360. Finally, select row source 360 evaluates expressions on its SELECT list for each input row and produces the entire query result.

In this execution plan, the SORT ORDER BY COUNT STOPKEY (i.e., the ROWNUM predicate pushed into the SORT ORDER BY operation) is replicated and pushed further down into the DFO—represented by Query Slaves 510-514—doing the parallel scan plus evaluating the expensive expression. As in the case of E14, with this pushing, the communication cost between Query Coordinator 540 and Query Slaves 530-534 is reduced as the traffic between the two across Table Queue 590 is reduced.

Interaction with Constant Predicate

A constant predicate is a filter predicate whose value is unrelated to any rows being considered for selection in a query. Examples of constant predicates are "1=0" or "1000<SELECT MAX(sal) FROM T2". The usage of constant predicate is quite common in parallel statements like

```
CREATE TABLE T_dest PARALLEL 2 AS SELECT
    FROM T_src WHERE 1=0;
``` which is an ad hoc table creation statement that creates an empty table T_dest using the schema of T_src. In this statement, the query after the "AS" keyword is a query, which can be optimized by the technique provided in the present invention.

Consider Q3 in combination with a constant predicate as follows:

```
SELECT prod_id
FROM (SELECT prod_id
    FROM Prod_id_table
    WHERE P_expensive_2
    ORDER BY relevance) prod_id_view
WHERE ROWNUM <= 10 AND <constant predicate>;
``` which essentially is Q3 with an additional predicate, <constant predicate>, in the containing query following an "AND" keyword.

A query coordinator controls the parallelized part of an execution plan, and incurs a startup cost of starting and gathering query slaves. This startup cost can be quite large in cluster configuration of a database system. To reduce the slave startup cost, the constant predicate is replicated and pulled up above the query coordinator but under the operation evaluating the expensive expression, so that the constant predicate is evaluated before query slaves are started. This handling of the constant predicate is illustrated by an execution plan as follows:

```
SELECT STATEMENT
    COUNT STOPKEY(k)
    FILTER(P_expensive_2)
    FILTER(constant predicate)
    PX COORDINATOR
    |(parallel to serial TQ)
```

-continued

```
    VIEW
    SORT ORDER BY
    |(range TQ)
    PX GRANULE ITERATOR
    TABLE ACCESS FULL(Prod_id_table)
```

If the constant predicate turns out to be TRUE, it becomes a pass-through and the rest of query proceeds as if there were no constant predicate. If the constant predicate turns out to be FALSE at runtime, then slaves are not spawned since there is no need to fetch any row from a source table for an empty target table creation. Thus, slave acquisition and joining costs will not be incurred.

Other Extensions

For queries that have more than one expensive expression, delaying evaluation of those expressions can be accomplished by applying delaying evaluation to each of those expressions separately or in combination. For example, if two or more expensive expressions are in one filter predicate, delaying evaluation of an expensive expression can apply to the two or more expensive expressions as a single unit. Similarly, when expensive expressions appear in two or more filter predicates, delaying evaluation of an expensive expression can apply to the two or more predicates separately or as a whole. Even if separate application of delaying evaluation to each expensive expression is chosen, it may be done in such manner as round-robin, sequential, random, ordered, or any other techniques known in the art.

Delaying evaluation of expensive expressions applies not only to a query but also to a query block or a subquery within a larger query. To apply the technique described herein the query block or the subquery within the larger query is considered as a query on its own.

Delaying evaluation of expensive expressions applies not only to SORT ORDER BY, but also to other blocking constructs, such as WINDOW SORT, GROUP BY SORT, OR DISTINCT SORT.

Choosing the Best Execution Plans

After one or more equivalent execution plan is identified, the best execution plan for a query can be chosen among a plan generated by the early evaluation technique and the one or more equivalent execution plan. This can be done based on criteria relating to a number of cost factors such as response time, CPU time, disk access, memory footprint, communication cost, etc, separately or in combination.

Figure 6:
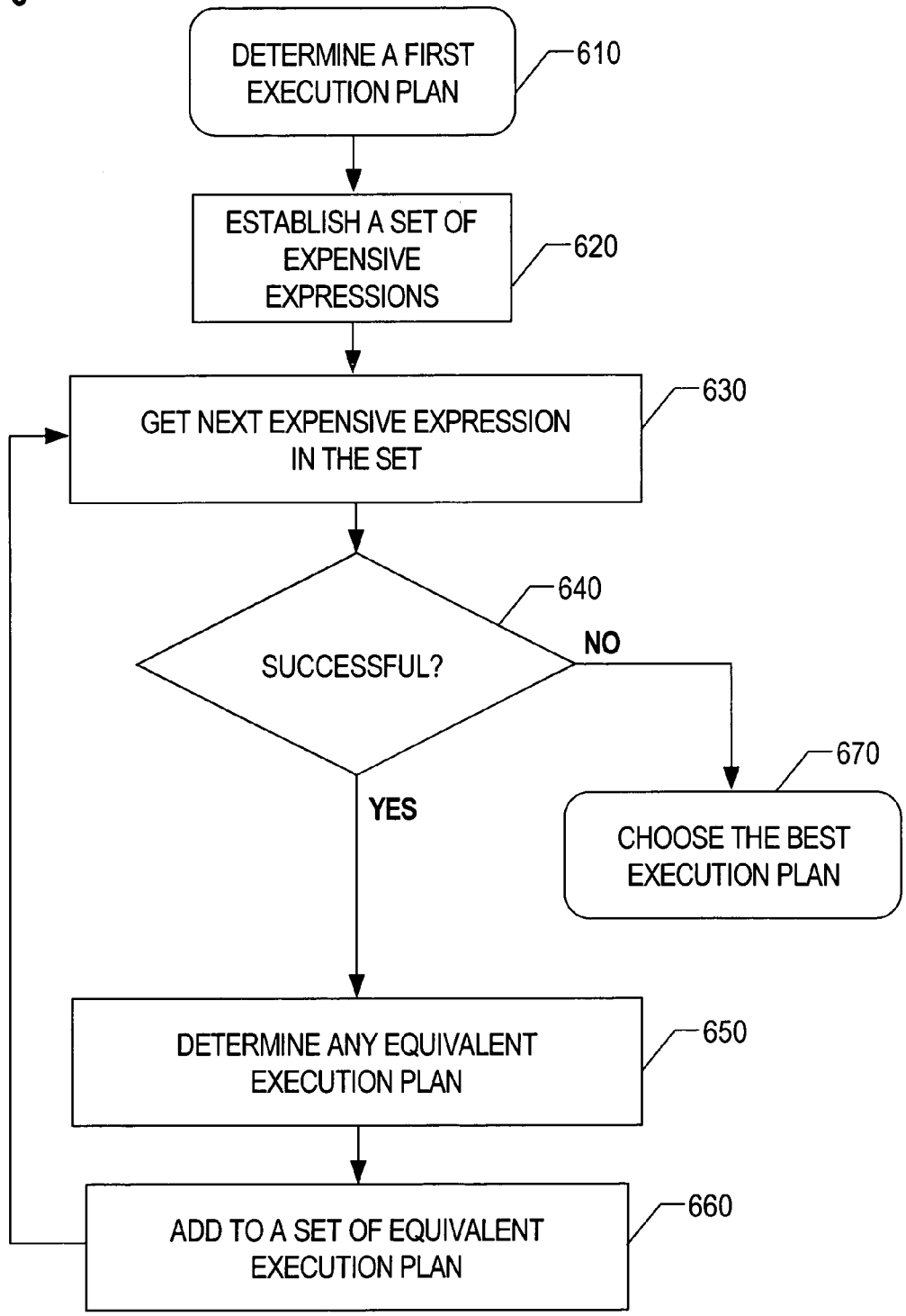
FIG. 6 is a flow chart depicting a process for choosing the best execution plan among an execution plan generated by the early evaluation technique and one or more equivalent execution plans.

FIG. 6 is a flow chart depicting a process for choosing the best execution plans, according to an embodiment of the present invention. The process starts by determining a first execution plan for a query in step 610. Subsequently, step 620 establishes a set of at least one expensive expression in the query. An empty set of equivalent execution plan can be initialized at step 620. For each expensive expression in the set of expensive expression, step 630 attempts to fetch the next expensive expression that has not yet been considered by the process for delayed evaluation. Step 640 checks whether the next expensive expression is successfully fetched by step 630. If there is no expensive expression established, or if the set of expensive expression have been fully traversed, step 640 goes to the last step, 670. On the other hand, if the next expensive expression is successfully fetched by step 630, step 640 goes to step 650, where it is determined if there are any equivalent execution plans, including an execution plan that delays the evaluation of the expensive expression. Any equivalent execution plans identified by step 650 are added to the set of at least one equivalent execution plan, which, according to one embodiment, has been initiated in step 620. In step 670, the best execution plan is chosen based on a set of criteria including, for example, response time, CPU time, disk access, memory footprint, communication cost.

Hardware Overview

Figure 7:
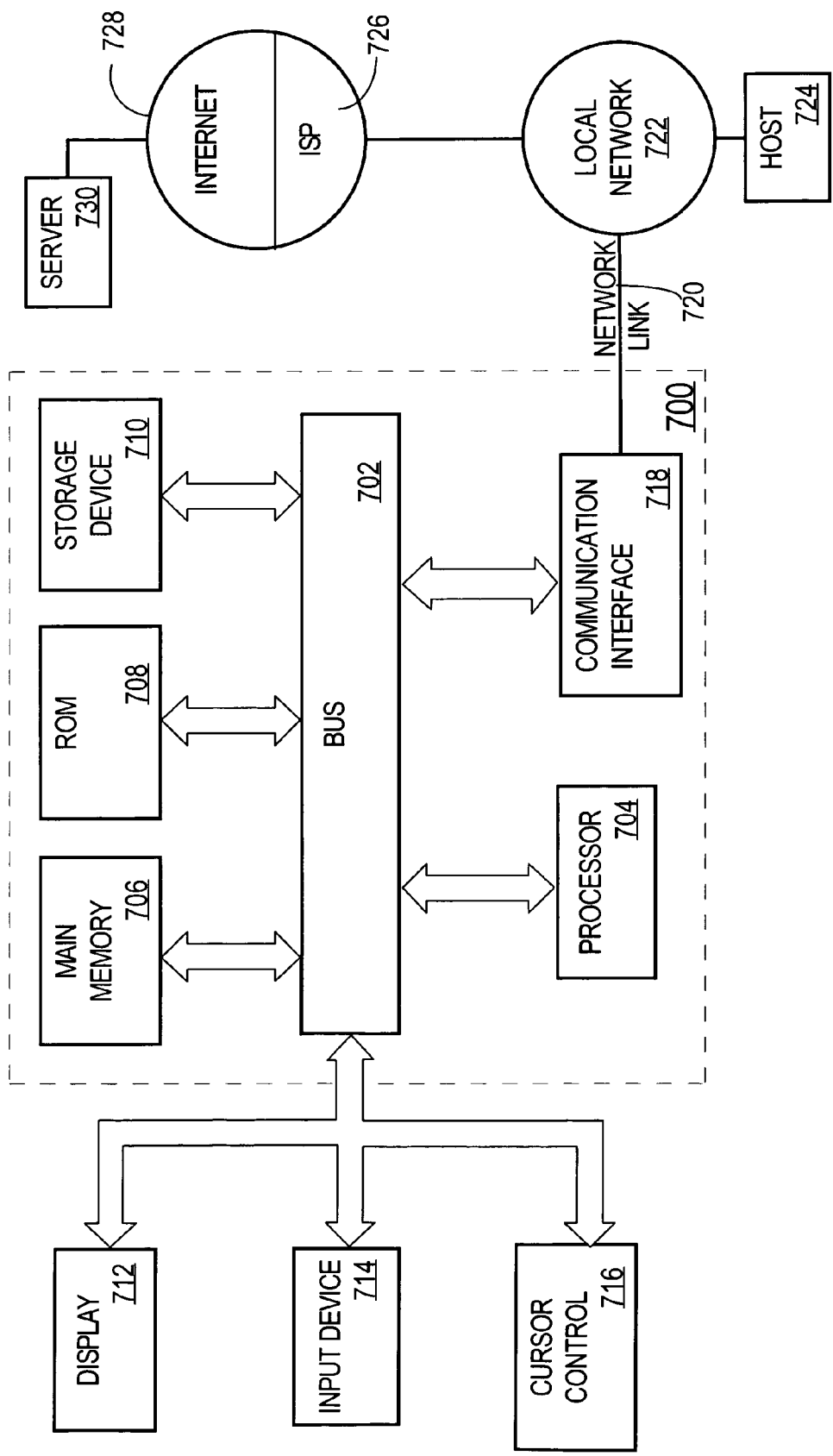
FIG. 7 is a block diagram depicting a computer system upon which an embodiment of the present invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-transitory media (non-volatile media), volatile media), and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of generating an execution plan for a query, comprising:
   establishing an expensive expression in the query;
   wherein establishing the expensive expression includes one or more of:
     referencing cost information for the expensive expression in an execution plan; and
     looking up a list of known expensive expressions for a match with the expensive expression;
   generating a first execution plan for the query in which an operation evaluating the expensive expression occurs no later than a non-empty set of operations that do not evaluate the expensive expression;
   generating one or more equivalent execution plans for the query, wherein generating the one or more equivalent execution plans includes generating, in response to said establishing the expensive expression in the query, an execution plan in which the operation evaluating the expensive expression occurs after the non-empty set of operations not evaluating the expensive expression; and
   choosing, based on a set of criteria, a particular execution plan from the first execution plan and the one or more equivalent execution plans;
   wherein the method is performed by one or more computing devices.

2. The method of claim 1 wherein the list of known expensive expressions is configurable.

3. The method of claim 1 wherein the non-empty set of operations not evaluating the expensive expression includes an operation relating to a blocking construct.

4. The method of claim 3 wherein the blocking construct is an ORDER BY, WINDOW SORT, GROUP BY SORT, or DISTINCT SORT construct.

5. The method of claim 1, wherein the one or more equivalent execution plans includes a non-parallelized execution plan for the query.

6. The method of claim 1 wherein the one or more equivalent execution plans includes a parallelized execution plan for the query.

7. The method of claim 6 wherein the query has a constant predicate.

8. The method of claim 1 wherein the step of choosing includes referencing cost information for each of the first execution plan and the one or more equivalent execution plans.

9. The method of claim 8 wherein the cost information includes usage information of CPU, memory, disk access, or network communication.

10. A machine-readable non-transitory medium storing one or more sequences of instructions for generating an execution plan for a query which instructions, when executed by one or more processors, cause performance of steps comprising:
    establishing an expensive expression in the query;
    wherein establishing the expensive expression includes one or more of:
      referencing cost information for the expensive expression in an execution plan; and
      looking up a list of known expensive expressions for a match with the expensive expression;
    generating a first execution plan for the query in which an operation evaluating the expensive expression occurs no later than a non-empty set of operations that do not evaluate the expensive expression;
    generating one or more equivalent execution plans for the query, wherein generating the one or more equivalent execution plans includes generating, in response to said establishing the expensive expression in the query, an execution plan in which the operation evaluating the expensive expression occurs after the non- empty set of operations not evaluating the expensive expression; and
    choosing, based on a set of criteria, a particular execution plan from the first execution plan and the one or more equivalent execution plans.

11. The machine-readable non-transitory volatile or non-volatile medium of claim 10, wherein the list of known expensive expressions is configurable.

12. The machine-readable non-transitory medium of claim 10, wherein the non-empty set of operations not evaluating the expensive expression includes an operation relating to a blocking construct.

13. The machine-readable non-transitory medium of claim 12, wherein the blocking construct is an ORDER BY, WINDOW SORT, GROUP BY SORT, or DISTINCT SORT construct.

14. The machine-readable non-transitory medium of claim 10, wherein the one or more equivalent execution plans includes a non-parallelized execution plan for the query.

15. The machine-readable non-transitory medium of claim 10, wherein the one or more equivalent execution plans includes a parallelized execution plan for the query.

16. The machine-readable non-transitory medium of claim 15, wherein the query has a constant predicate.

17. The machine-readable non-transitory medium of claim 10, wherein the instructions that cause choosing the particular execution plan include instructions which, when executed by the one or more processors, cause the one or more processors to perform referencing cost information for each of the first execution plan and the one or more equivalent execution plans.

18. The machine-readable non-transitory medium of claim 17, wherein the cost information includes usage information of CPU, memory, disk access, or network communication.

* * * * *

UNITED STATES PATENT AND TRADEMARK OFFICE
CERTIFICATE OF CORRECTION

| | | |
|---|---|---|
| PATENT NO. | : 7,877,379 B2 | Page 1 of 1 |
| APPLICATION NO. | : 11/242361 | |
| DATED | : January 25, 2011 | |
| INVENTOR(S) | : Waingold et al. | |

It is certified that error appears in the above-identified patent and that said Letters Patent is hereby corrected as shown below:

On Title page 3, item (56); in column 2, under "Other Publications", in reference file, insert -- U.S. Application No. 10/305,744, filed Nov. 27, 2002, Office Action, correspondence mailing date March 3, 2006. --.

On Title page 3, item (56); in column 2, under "Other Publications", in reference file, insert -- U.S. Application No. 10/305,768, filed Nov. 27, 2002, Office Action, correspondence mailing date July 6, 2006. --.

On Title page 3, item (56); in column 2, under "Other Publications", in reference file, insert -- U.S. Application No. 10/874,400, filed June 26, 2004, Office Action, correspondence mailing date Nov. 30, 2006. --.

On Title page 3, item (56); in column 2, under "Other Publications", in reference file, insert -- U.S. Application No. 10/153,983, filed May 22, 2002, Office Action, correspondence mailing date June 1, 2006. --.

On Title page 3, item (56); in column 2, under "Other Publications", in reference file, insert -- U.S. Application No. 09/757,399, filed Jan. 1, 2001. --.

In column 15, line 61, before "volatile" delete "media)," and insert -- media, --, therefor.

In column 18, line 25, in Claim 10, delete "non- empty" and insert -- non-empty --, therefor.

In column 18, line 30-31, in Claim 11, after "non-transitory" delete "volatile or non-volatile".

Signed and Sealed this
Eleventh Day of October, 2011

David J. Kappos
*Director of the United States Patent and Trademark Office*